United States Patent
Heinloth et al.

(10) Patent No.: US 9,120,158 B2
(45) Date of Patent: Sep. 1, 2015

(54) INTERNAL MILLING CUTTER

(75) Inventors: Markus Heinloth, Postbauer-Heng (DE); Walter Thurnwald, Stein (DE); Terry Takayama, Amberg (DE)

(73) Assignee: KENNAMETAL INC., Latrobe, PA (US)

( * ) Notice: Subject to any disclaimer, the term of this patent is extended or adjusted under 35 U.S.C. 154(b) by 271 days.

(21) Appl. No.: 13/391,874

(22) PCT Filed: Aug. 13, 2010

(86) PCT No.: PCT/EP2010/004989
§ 371 (c)(1),
(2), (4) Date: Feb. 23, 2012

(87) PCT Pub. No.: WO2011/026557
PCT Pub. Date: Mar. 10, 2011

(65) Prior Publication Data
US 2012/0148351 A1    Jun. 14, 2012

(30) Foreign Application Priority Data

Sep. 3, 2009   (DE) .................. 20 2009 011 949 U
Jan. 26, 2010  (DE) .................. 20 2010 001 331 U

(51) Int. Cl.
B23C 5/08      (2006.01)
B23B 31/113    (2006.01)
B23C 5/26      (2006.01)
B23C 5/22      (2006.01)

(52) U.S. Cl.
CPC ............. *B23B 31/113* (2013.01); *B23C 5/08* (2013.01); *B23C 5/26* (2013.01); *B23C 2210/503* (2013.01); *B23C 2215/20* (2013.01); *B23C 2220/68* (2013.01); *B23C 2240/04* (2013.01); *Y10T 407/1928* (2015.01); *Y10T 407/1934* (2015.01)

(58) Field of Classification Search
CPC ............... B23C 5/2291; B23C 5/2234; B23C 2210/503
USPC ........ 82/70.2, 106; 407/37, 44, 47, 66, 34, 53
See application file for complete search history.

(56) References Cited

U.S. PATENT DOCUMENTS 3,848,489 A * 11/1974 Santana .................... 82/61
4,204,787 A *  5/1980 McCray et al. ............ 409/234
4,325,644 A *  4/1982 Curry ..................... 400/161.4
4,325,664 A *  4/1982 Mori ....................... 409/234

(Continued)

FOREIGN PATENT DOCUMENTS

DE        34 38 978 C1    12/1985
DE   20 2010 002331 U1     4/2010

(Continued)

OTHER PUBLICATIONS

May 13, 2014-OA-translationofNotice.

(Continued)

*Primary Examiner* — Will Fridie, Jr.
(74) *Attorney, Agent, or Firm* — Larry R. Meenan

(57) ABSTRACT

The invention relates to an internal milling cutter including an annular tool support (11) equipped on the inner casing thereof with cutting inserts. The tool support (11) is fastened in a machine holder (10). According to the invention, a bayonet-type connection is provided between the tool support (11) and the machine holder (10).

2 Claims, 2 Drawing Sheets

(56) References Cited

U.S. PATENT DOCUMENTS

| | | | |
|---|---|---|---|
| 4,478,541 A * | 10/1984 | Okada et al. | 409/232 |
| 5,433,562 A * | 7/1995 | Phillips et al. | 409/233 |
| 6,095,021 A * | 8/2000 | Epperson | 82/70.2 |
| 6,571,451 B2 * | 6/2003 | Satran et al. | 29/447 |
| 6,862,967 B2 * | 3/2005 | Sonzogni | 82/123 |
| 7,544,020 B2 * | 6/2009 | Emoto et al. | 407/34 |
| 2010/0104382 A1 | 4/2010 | Heinloth et al. | |

FOREIGN PATENT DOCUMENTS

| | | | | |
|---|---|---|---|---|
| EP | 0 079 871 | A1 | | 5/1983 |
| GB | 2 028 200 | A | | 3/1980 |
| GB | 2 284 369 | A | | 6/1995 |
| JP | 55031596 | A | | 3/1980 |
| JP | 56011025 | U | | 1/1981 |
| JP | 58071040 | A | | 4/1983 |
| JP | 04076314 | U | | 7/1992 |
| JP | 07011216 | U | | 2/1995 |
| JP | 07185918 | A | | 7/1995 |
| JP | 2000343315 | A | * 12/2000 | 407/34 |

OTHER PUBLICATIONS

State Intellectual Property Office of the People's Republic of China, "First Office Action, including English language translation thereof", Nov. 8, 2013, 18 pp.

* cited by examiner

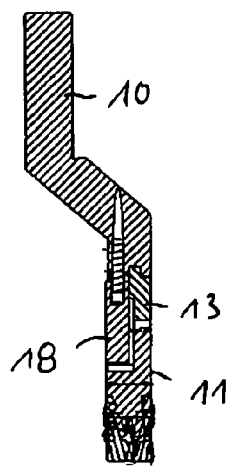
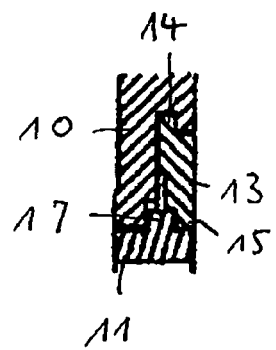
FIG. 2  FIG. 3
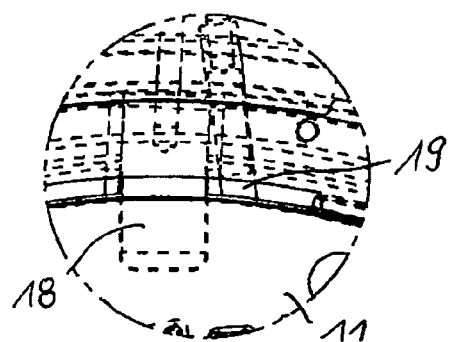
FIG. 4

INTERNAL MILLING CUTTER

CLAIM TO PRIORITY

This application is a National Phase of International Application PCT/EP2010/004989, filed on Aug. 13, 2010, which claims priority to German Application No. 20 2009 011 949.1, filed on Sep. 3, 2009, and German Application No. 20 2010 001 331.3, filed on Jan. 26, 2010, the entire contents of all these applications are incorporated herein by reference.

BACKGROUND OF THE INVENTION

1. Field of the Invention

The invention relates to an internal milling cutter with an annular tool support which, on its inner lateral surface, is fitted with cutting inserts and is fastened in a machine holder.

2. Description of Related Art

In the machining methods known according to the prior art, the crankshafts normally pass through a plurality of machining stages. First of all, the cast or forged shafts are subjected to a cutting operation, such as turn broaching, turn-turn broaching, internal rotary milling and external milling, especially at high milling speeds wherein the allowance provided from the casting or forging point of view is removed down to a residual value within the millimeter range.

Annular milling cutter disks with internal cutting edges, preferably indexable cutter inserts, have been known for some time now, also in respect of the use thereof, for crankshaft milling.

DE 34 38 978 C1 describes a device for fastening an internal-milling-cutter support on the accommodating flange of the milling-cutter drum of a crankshaft-milling machine by means of locking elements which, with the internal-milling-cutter support being pressed against the accommodating flange of the milling-cutter drum, can be brought into abutment with opposing surfaces on the respectively other part. Wedges are fastened on the support or on the milling-cutter drum, and the sub-surfaces of these wedges form the opposing surfaces. Wedges in the form of ring elements are arranged on the milling-cutter drum or on the support, it being possible for these wedges to interact therewith and to be displaced radially in relation to the support axis, wherein in each case one eccentric is provided as a displacement drive for the displaceable part such that the combination of the eccentric with the wedge is self-locking.

DE 10 2009 006 010.3 describes a device for fastening an annular milling-tool support, in particular of an internal milling cutter, on a machine holder by means of a threaded connection between the milling-tool support and the machine holder. This configuration has production-related advantages since only a small number of installation parts are required. Furthermore, this connection is easy to handle. The disadvantage, however, is that the tool-support disk has to be rotated a number of times in order to be securely fixed or released.

SUMMARY OF THE INVENTION

It is an object of the present invention to improve the connection between the tool support and the machine holder in respect of quicker handling.

This object is achieved by an internal milling cutter according to claim 1. According to the invention, the tool support and the machine holder are fastened on one another by means of a bayonet connection. A bayonet connection has the particular advantage that only a small angle of rotation has to be covered in order for it to be possible for the parts to be mounted on one another. In addition, such connecting means are of straightforward design, are easy to produce and are not susceptible to malfunctioning during operation.

It is basically immaterial which part has the protrusions, which are guided, and rotated, in corresponding recesses until the protrusions are retained on undercuts.

According to a further configuration of the invention, a strip-like annular body with equidistant protrusions is used as part of the bayonet connection which is screwed in a releasable manner to the tool support or the machine holder and, together therewith, forms a groove-like partially interrupted bayonet guide. This annular body can advantageously be easily exchanged if frequent tool changeover has resulted in wear which means that the bayonet guide is no longer reliable.

The bayonet connections used are preferably those in which the tool support, on its outer lateral surface, has 2 to 20, preferably 12, radially projecting protrusions, which are retained directly on corresponding undercuts of the tool support or of the strip-like annular body. It generally suffices to have 12 protrusions with corresponding abutments on undercuts in order to provide for reliable and constantly reproducible, identical orientation.

In order for it to be possible, on account of production tolerances, to compensate for concentricity errors, preferably adjustable wedges are used as centering elements, which are known, in principle, from the prior art, and are described, for example, in DE 34 39 978 C1 mentioned above.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

Further variants and advantages will be described hereinbelow with reference to the drawings, in which:

FIG. 2 shows a sectional view taken along line A-A in FIG. 1,

FIG. 3 shows a sectional view taken along line B-B in FIG. 1, and

FIG. 4 shows a partially sectional view with a wedge as a centering element.

DETAILED DESCRIPTION OF THE INVENTION

Figure 1:
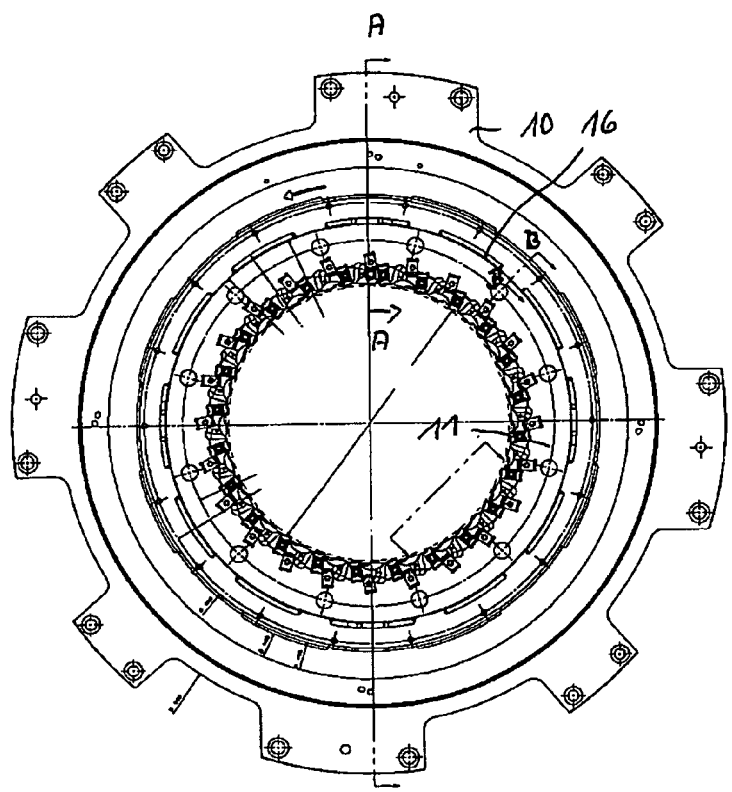
FIG. 1 shows a plan view of a tool holder with a tool support mounted therein.

External milling cutters, which rotate about their longitudinal axis during the cutting and have a disk-shaped tool holder which has peripherally arranged cassettes, which are each fitted with a cutting insert and which are fixed on an annular or partly annular or segmental holder detachably fastened either directly to a machine spindle or indirectly to a machine spindle via an adapter, are described, for example, in DE 10 2007 013 153 A1.

As far as the machine tool is concerned FIG. 1 shows a machine holder 10, which is fastened in a conventional manner on the machine tool. This machine holder 10 is fastened to an annular tool support 11 via a bayonet connection, which can be released by movement of the internal milling cutter in the direction of the arrow 12. The tool support, on its inner lateral surface and on its side surfaces, is fitted with indexable cutter inserts, which are selected and arranged in accordance with the use purpose, for example roughing or smoothing work on a crankshaft. As can be seen from FIG. 3, there is an additional part used for creating a bayonet connection in the form of a strip-like annular body 13 which, on its outer lateral surface, has noses 14, which bear in corresponding groove guides of the machine holder 10. Furthermore, the annular body 13, on its inner lateral surface, has protrusions 15, which are interrupted, in part, at equidistant intervals by openings 16 (see FIG. 1). These openings 16 have a width and height which allow through-passage of the radially projecting protrusions 17 of the tool support. By virtue of the tool support 11 being rotated (counter to the direction of the arrow 12), these protrusions are guided into undercut regions of the strip-like annular body 13. In the case illustrated in FIG. 3, the protrusions 17 are guided in a groove-like recess which is formed, on the one hand, by a recess in the annular strip body 13 and, on the other hand, by a recess located opposite in the body of the machine holder 10. FIGS. 2 and 4, in addition, show a centering element 18 as an adjustable wedge, in the case of which radial adjustability is made possible by means of an eccentric 19 or else similarly acting displacement elements. This centering element, which is known, in principle, according to the prior art, serves to compensate for any concentricity errors.

It is, of course, possible, within the context of the present invention, to use rotation-prevention means or clamping wedges as aids to secure the bayonet connection in the closed state. Also possible are stops to limit the relative rotation of the tool supports used in each case. If necessary, it is also possible to select bayonet-connection configurations which are not rotationally symmetrical, or are rotationally symmetrical only at certain angles of rotation, these ensuring certain preliminary positioning of the tool supports upon introduction into the machine holder.

What is claimed is:

1. An internal milling cutter with an annular tool support which, on its inner lateral surface, is fitted with cutting inserts and is fastened in a machine holder comprising a bayonet connection between the tool support and the machine holder, wherein the bayonet connection comprises a strip-like annular body which contacts the tool support at one end, the strip-like annular body has protrusions at a side of the strip-like annular body which contacts the tool support, and the bayonet connection is screwed in a releasable manner to the tool support or the machine holder, and wherein groove guides are formed in the machine holder, and wherein the strip-like annular body has a plurality of radial projections on its outer lateral surface which are retained in the groove guides, and wherein the tool support has a protrusion which is guided in a groove-like recess formed by a first undercut formed in the strip-like annular body on its inner lateral surface and a second undercut opposite the first undercut formed in the machine holder.

2. The internal milling cutter as claimed in claim 1, wherein the bayonet connection is accomplished by moving one or both of the annular tool support and the machine holder along a central axis with respect to each other and then rotating one or both of the annular tool support and the machine holder about the axis.

* * * * *